(12) United States Patent
Misu et al.

(10) Patent No.: US 11,334,299 B2
(45) Date of Patent: May 17, 2022

(54) IMAGE FORMING APPARATUS AND NON-TRANSITORY COMPUTER READABLE MEDIUM

(71) Applicant: FUJIFILM BUSINESS INNOVATION CORP., Tokyo (JP)

(72) Inventors: Nagamasa Misu, Kanagawa (JP); Seiji Shiraki, Kanagawa (JP); Ryosuke Tsuji, Kanagawa (JP); Yushiro Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/120,886

(22) Filed: Dec. 14, 2020

(65) Prior Publication Data

US 2021/0318839 A1     Oct. 14, 2021

(30) Foreign Application Priority Data

Apr. 13, 2020   (JP) .............................. JP2020-071486

(51) Int. Cl.
*G06F 3/12* (2006.01)
*G06V 10/24* (2022.01)
*G06V 30/40* (2022.01)

(52) U.S. Cl.
CPC .......... *G06F 3/1208* (2013.01); *G06F 3/1256* (2013.01); *G06V 10/242* (2022.01); *G06V 30/40* (2022.01)

(58) Field of Classification Search
CPC . G06K 9/3208; G06K 9/00442; G06F 3/1256
See application file for complete search history.

(56) References Cited

U.S. PATENT DOCUMENTS

| | | | |
|---|---|---|---|
| 10,527,991 B2 | 1/2020 | Sugata | |
| 2004/0184836 A1* | 9/2004 | Sakabe | .................. G03G 15/36 399/182 |
| 2008/0309957 A1* | 12/2008 | Horiuchi | ............. G06K 9/3208 358/1.9 |
| 2016/0286065 A1* | 9/2016 | Harada | ............... H04N 1/00803 |
| 2016/0379096 A1* | 12/2016 | Hakamada | ........... B41J 2/16585 358/1.4 |
| 2019/0347052 A1 | 11/2019 | Yamaguchi et al. | |

FOREIGN PATENT DOCUMENTS

| | | |
|---|---|---|
| JP | 2019-111758 A | 7/2019 |
| JP | 2019-198966 A | 11/2019 |
| JP | 2019-198977 A | 11/2019 |

* cited by examiner

*Primary Examiner* — King Y Poon
*Assistant Examiner* — Michael Burleson
(74) *Attorney, Agent, or Firm* — Oliff PLC

(57) ABSTRACT

An image forming apparatus includes a memory, and a processor configured to: read a first image of a sheet in a state in which the sheet is held on a sheet holding unit, the sheet being a sheet on which an image has been formed; detect a symbol from the first image of the sheet which has been read, the symbol indicating an orientation of the first image; and, when the orientation of the first image indicated by the detected symbol is different from an orientation of a second image that is to be formed on the sheet, perform a correction process of matching the orientation of the first image with the orientation of the second image that is to be formed on the sheet, the orientation of the first image being indicated by the detected symbol.

8 Claims, 18 Drawing Sheets

FIG. 2
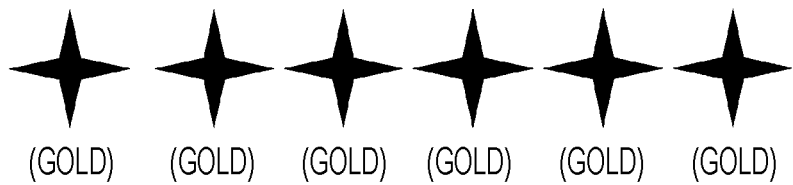
Certificate of Achievement
You are honored with a high score
in the 86th AAA competition.
January 15, 2020
XXXX XXXX
Congratulations! (GOLD)
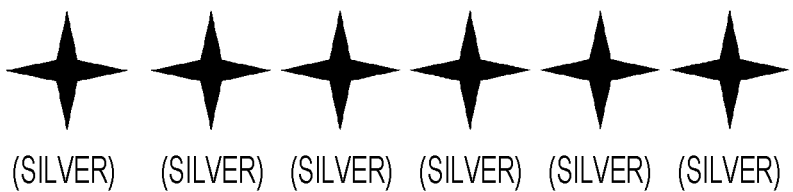

FIG. 4
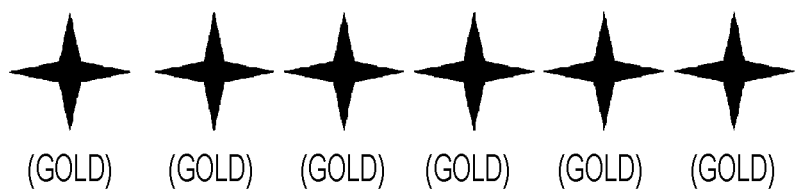
(GOLD) (GOLD) (GOLD) (GOLD) (GOLD) (GOLD)
Congratulations! (GOLD)
Certificate of Achievement
You are honored with a high score
in the 86th AAA competition.
January 15, 2020
XXXX XXXX
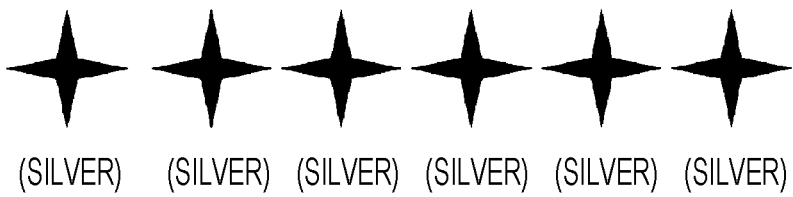
(SILVER) (SILVER) (SILVER) (SILVER) (SILVER) (SILVER)

Certificate of Achievement

You are honored with a high score
in the 86th AAA competition.

January 15, 2020
XXXX XXXX

80

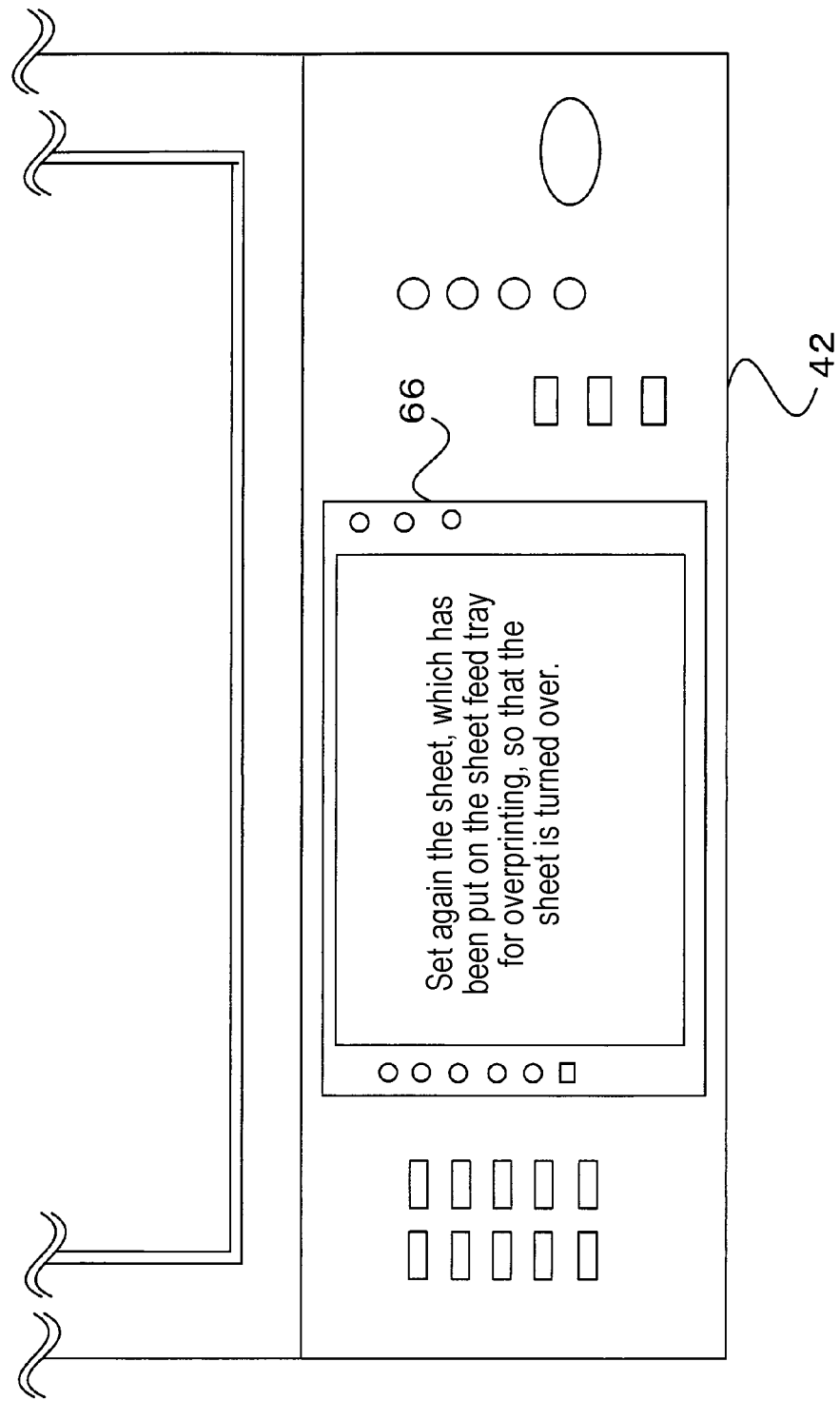

FIG. 16

| PAGE NUMBER | COORDINATES (mm) | |
|---|---|---|
| | X COORDINATE | Y COORDINATE |
| 1 | 190 | 270 |
| 2 | 190 | 270 |
| 3 | 190 | 30 |
| 4 | 190 | 30 |
| ⋮ | ⋮ | ⋮ |

IMAGE FORMING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-071486 filed Apr. 13, 2020.

BACKGROUND

(i) Technical Field

The present disclosure relates to an image forming apparatus and a non-transitory computer readable medium.

(ii) Related Art

Japanese Unexamined Patent Application Publication No. 2019-111758 discloses a print system which performs overprinting in which first-printing is performed on a medium and second-printing is then performed on the medium. In the first-printing, test printing related to the first-printing is performed. In the test printing, a chart, which is asymmetrical with respect to rotation of the orientation of a medium, is printed on the medium.

Japanese Unexamined Patent Application Publication No. 2019-198966 discloses an image processing apparatus which displays, in second-printing, a description image for resetting a printed medium to a sheet feed unit after the first printing is finished. Thus, a user knows which operations are to be performed in the second and subsequent print operations.

Japanese Unexamined Patent Application Publication No. 2019-198977 discloses an image processing apparatus which performs a print process by generating, in second-printing, second-printing print jobs for performing printing using the same color multiple times, on the basis of specifications for hiding the color of a medium on which printing is performed.

SUMMARY

Aspects of non-limiting embodiments of the present disclosure relate to an image forming apparatus and a non-transitory computer readable medium which enable overprinting to be prevented from being performed incorrectly. The incorrect overprinting occurs when the orientation or face of a sheet is not set correctly in overprinting for printing a second image on the sheet, on which a first image has been formed, so that the second image is superimposed on the first image.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a memory, and a processor configured to: read a first image of a sheet in a state in which the sheet is held on a sheet holding unit, the sheet being a sheet on which an image has been formed; detect a symbol from the first image of the sheet which has been read, the symbol indicating an orientation of the first image; and, when the orientation of the first image indicated by the detected symbol is different from an orientation of a second image that is to be formed on the sheet, perform a correction process of matching the orientation of the first image with the orientation of the second image that is to be formed on the sheet, the orientation of the first image being indicated by the detected symbol.

BRIEF DESCRIPTION OF THE DRAWINGS

Exemplary embodiment of the present disclosure will be described in detail based on the following figures, wherein:

FIG. 2 is a diagram illustrating an output sample of an image formed through overprinting;

FIG. 4 is a diagram illustrating an output sample obtained when overprinting is not performed correctly;

FIG. 14 is a diagram illustrating an exemplary state in which a user is instructed, through an operation panel, to turn over a sheet;

FIG. 16 is a diagram illustrating an exemplary coordinates table indicating the positions of special marks;

DETAILED DESCRIPTION

Figure 1:
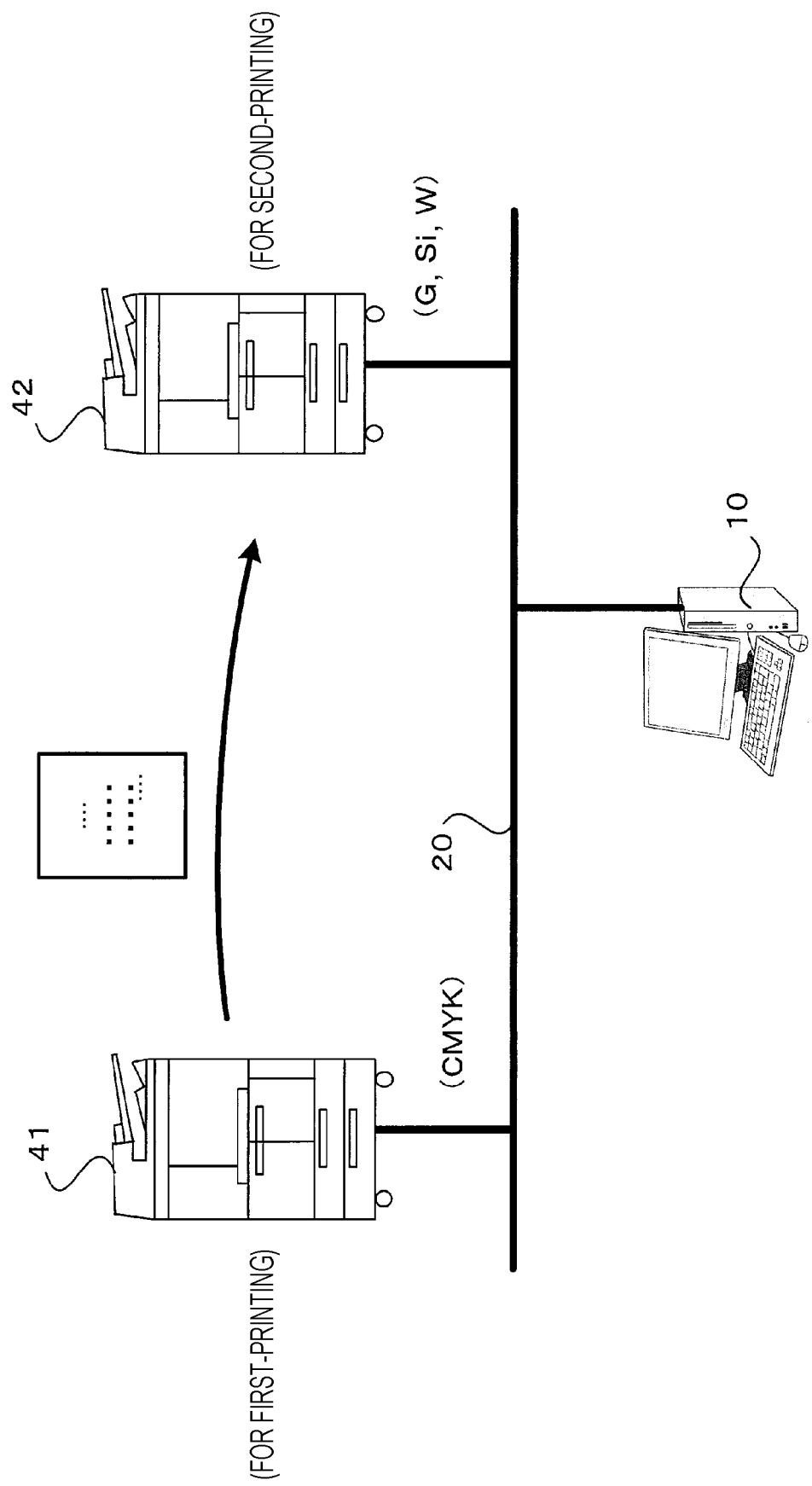
FIG. 1 is a diagram illustrating the configuration of an image forming system according to an exemplary embodiment of the present disclosure.

An exemplary embodiment of the present disclosure will be described in detail by referring to the drawings.

FIG. 1 is a diagram illustrating the system configuration of an image forming system according to an exemplary embodiment of the present disclosure.

As illustrated in FIG. 1, the image forming system according to an exemplary embodiment of the present disclosure includes image forming apparatuses 41 and 42 and a terminal apparatus 10 which are connected to each other over a network 20. The terminal apparatus 10 generates print data which is transmitted to the image forming apparatuses 41 and 42 over the network 20. The image forming apparatuses 41 and 42 receive the print data transmitted from the terminal apparatus 10, and output images on sheets in accordance with the print data. The image forming apparatuses 41 and 42 are so-called multifunction devices having multiple functions, such as the print function, the scan function, the copy function, and the faxing function.

To obtain an image, which is incapable of being obtained through a single print process, overprinting is performed in the image forming system according to the exemplary embodiment: the image forming apparatus 41 performs first-printing on a sheet; the sheet, on which first-printing has been performed, is set on the second-printing image forming apparatus 42; second-printing is performed on the sheet which has been set.

In the first-printing image forming apparatus 41, cyan, magenta, yellow and black (CMYK) color toners are set so that normal color images are output on sheets by using the CMYK color toners. The image forming apparatus 42 is a printer which is capable of forming images of special color other than the normal color such as CMYK colors on sheets. The special color includes various types of color other than CMYK, such as glossy metallic colors, for example, silver (Si) and gold (G), white (W), and transparent color (clear). In the exemplary embodiment described below, the case in which the image forming apparatus 42 is capable of forming an image of three types of special color, gold (G), silver (Si), and white (W), will be described.

In the image forming system according to the present exemplary embodiment having such a configuration, the two image forming apparatuses 41 and 42 perform overprinting. Thus, a CMYK color image and an image of gold, silver, and white may be formed on a single sheet.

FIG. 2 illustrates an output sample of an image formed through such overprinting.

FIG. 2 illustrates the output sample formed by combining an image using the CMYK colors with an image including gold or silver patterns and characters. In the output sample, the character representations, such as "gold" and "silver", indicate that images, to which such characters are attached, are of gold or silver, and this does not indicate that the characters, "gold" and "silver", are printed.

Figure 3B:
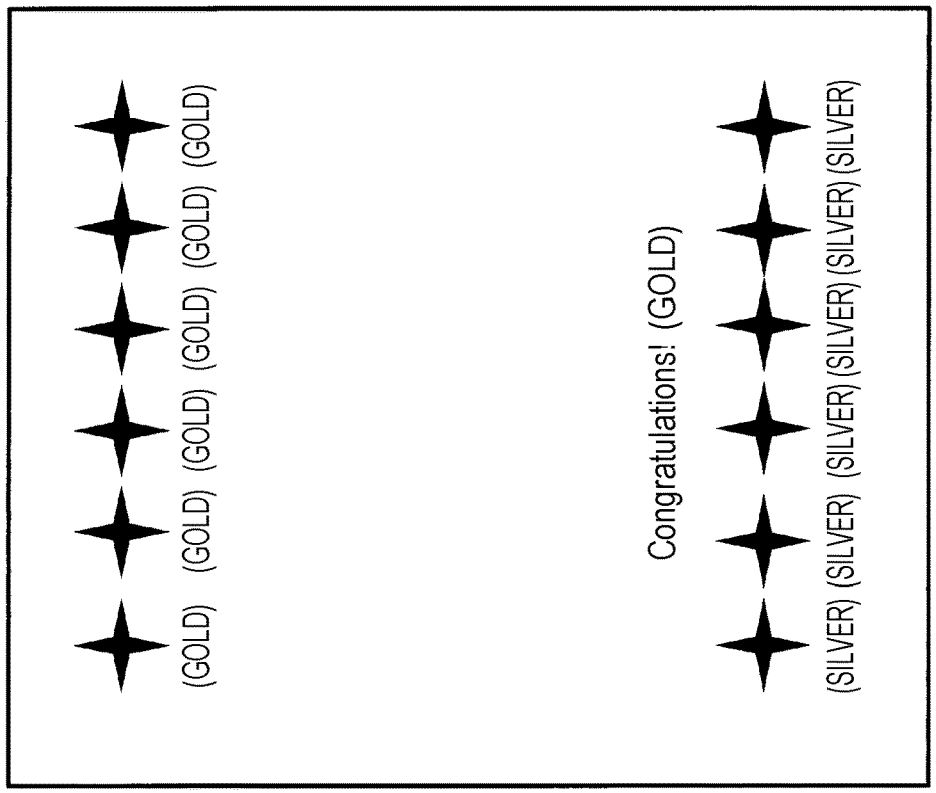
FIG. 3B is a diagram illustrating an image which is input from a terminal apparatus to an image forming apparatus when the image forming apparatus performs second-printing.
Figure 3A:
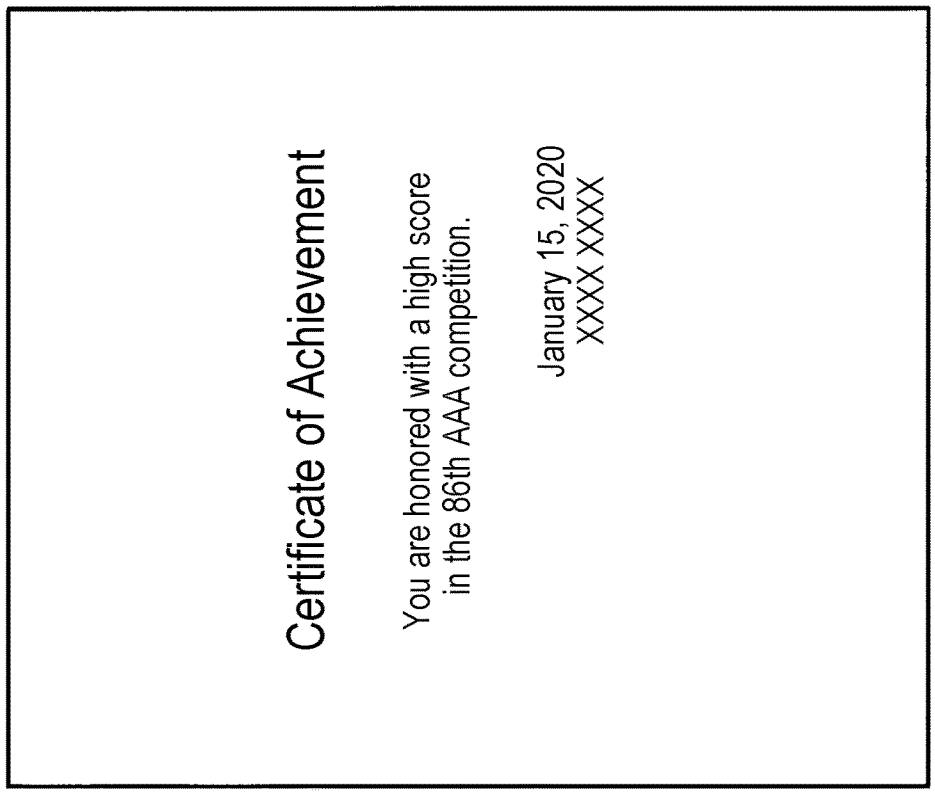
FIG. 3A is a diagram illustrating an image which is input from a terminal apparatus to an image forming apparatus when the image forming apparatus performs first-printing.

In the case of obtaining the output image as illustrated in FIG. 2, an image, which is input from the terminal apparatus 10 to the image forming apparatus 41, and an image, which is input to the image forming apparatus 42, are the images as illustrated in FIG. 3A and FIG. 3B, respectively.

FIG. 3A illustrates an image which is input from the terminal apparatus 10 to the image forming apparatus 41 in first-printing performed by the image forming apparatus 41. FIG. 3B illustrates an image which is input from the terminal apparatus 10 to the image forming apparatus 42 in second-printing performed by the image forming apparatus 42.

The image forming apparatus 41 outputs a sheet on which the image as illustrated in FIG. 3A has been formed. The sheet, on which the image as illustrated in FIG. 3A has been formed, is set on the sheet feed tray or the like of the image forming apparatus 42. The image as illustrated in FIG. 3B is overprinted on the sheet. Thus, the image as illustrated in FIG. 2 is obtained.

In the overprinting as described above, if the sheet, on which first-printing has been performed by the image forming apparatus 41, is set on the image forming apparatus 42 so as to be opposite in orientation, second-printing is not performed correctly, and the image illustrated in FIG. 4 is obtained finally. FIG. 4 illustrates the output sample in which overprinting is not performed correctly due to the orientation, which is opposite to the orientation in the second-printing, of the image which has been printed in the first-printing.

Also in the case where a sheet, on which first-printing has been performed, is set on the image forming apparatus 42 so as to be turned over, not opposite in orientation, overprinting is not performed correctly.

The image forming apparatus 42 according to the present exemplary embodiment has a configuration described below. Thus, in overprinting in which an image is overprinted on a sheet on which an image has been formed by the image forming apparatus 41, the overprinting is prevented from being performed incorrectly due to the sheet whose orientation or face is not set correctly.

Figure 5:
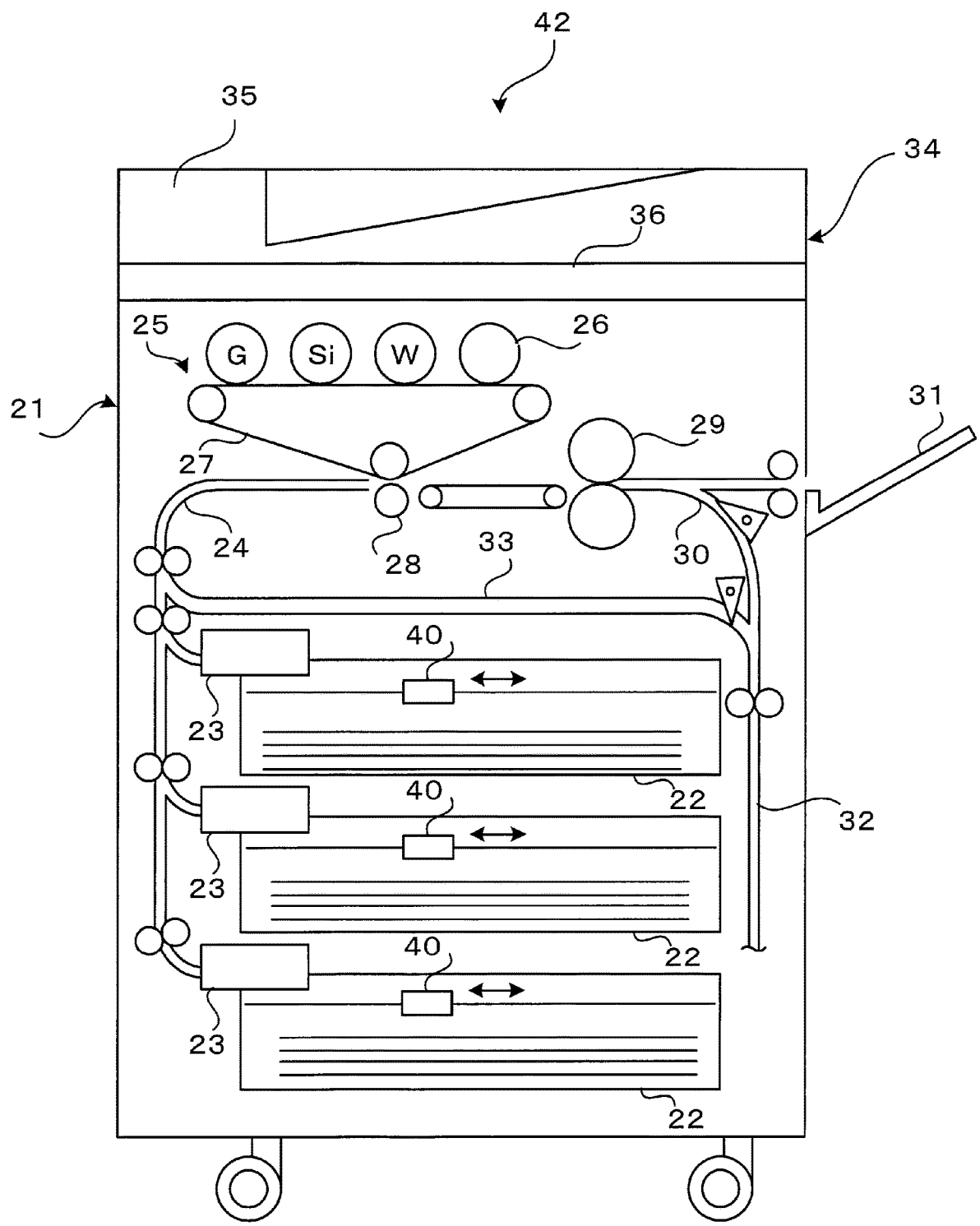
FIG. 5 is a sectional view of the configuration of a second-printing image forming apparatus.

The configuration of the second-printing image forming apparatus 42 in the image forming system according to the present exemplary embodiment will be described by referring to FIG. 5. FIG. 5 is a sectional view of the configuration of the image forming apparatus 42 according to the present exemplary embodiment.

The image forming apparatus 42 includes a printer 21 and an image reading apparatus 34. The printer 21 includes, for example, three sheet feed trays 22. Each of the sheet feed trays 22 is provided with a supply head 23. Each sheet feed tray 22 is a sheet holding unit which holds sheets for image formation.

When one of the sheet feed trays 22 is selected, its supply head 23 is activated to supply a sheet from the selected sheet feed tray 22 through a sheet supply path 24 to an image forming unit 25.

In the image forming unit 25, photoreceptors 26 for gold (G), silver (Si), and white (W) are arranged side by side, and an intermediate transfer belt 27 is provided.

Around each of the photoreceptors 26, a charging device, an exposure device, a developing device, a first transfer device, a cleaning device, and the like (not illustrated) are disposed. Toner images formed on the photoreceptors 26 are transferred to the intermediate transfer belt 27. In the black-white setting, only the photoreceptor for black is ready to operate.

The toner images on the intermediate transfer belt 27 are transferred to a recording medium, which has been conveyed, by using a second transfer roller 28, and are fixed by a fixing device 29. The recording medium such as a sheet, on which the toner images have been fixed, is conveyed through a sheet discharge path 30 and is discharged to the discharge tray 31.

In the duplex-printing setting, a sheet, of which the fixing device 29 has performed fixing on the front surface, is conveyed through the sheet discharge path 30 to a reversing device 32, and is reversed by the reversing device 32. Then, the sheet is conveyed through a sheet reversing path 33 back to the sheet supply path 24 and is conveyed to the image forming unit 25 where printing is performed on the back surface.

The image reading apparatus 34 includes an automatic document feeder 35 which is capable of reading a doublesided document. A document is conveyed by the automatic document feeder 35 to platen 36 where a reading unit including a charge coupled device (CCD) or the like reads the image of the document. The automatic document feeder 34 also serves as a platen cover. A document is put on the platen 36 by opening the platen cover. The opening/closing state of the platen cover may be detected by a platen-cover opening/closing detector.

The image forming apparatus 42 also includes a facsimile modem connected to a public line, and a network communication device connected to a network such as a local-area network (LAN). The network communication device included in the image forming apparatus 10 may be used to transmit, to a terminal connected to the network, an image which has been read by the image reading apparatus 34. In execution of such a process, the image forming apparatus 10 also has a function as a facsimile transmission apparatus.

In the image forming apparatus 42 according to the present exemplary embodiment, each sheet feed tray 22 is provided with a scanner 40 for reading the image of a sheet, which is held on the sheet feed tray 22, in the state in which the sheet is held on the sheet feed tray 22.

Each of the scanners 40 performs scanning in the sheet feed tray 22. Thus, each scanner 40 reads the image of the topmost sheet held on the sheet feed tray 22.

Figure 6:
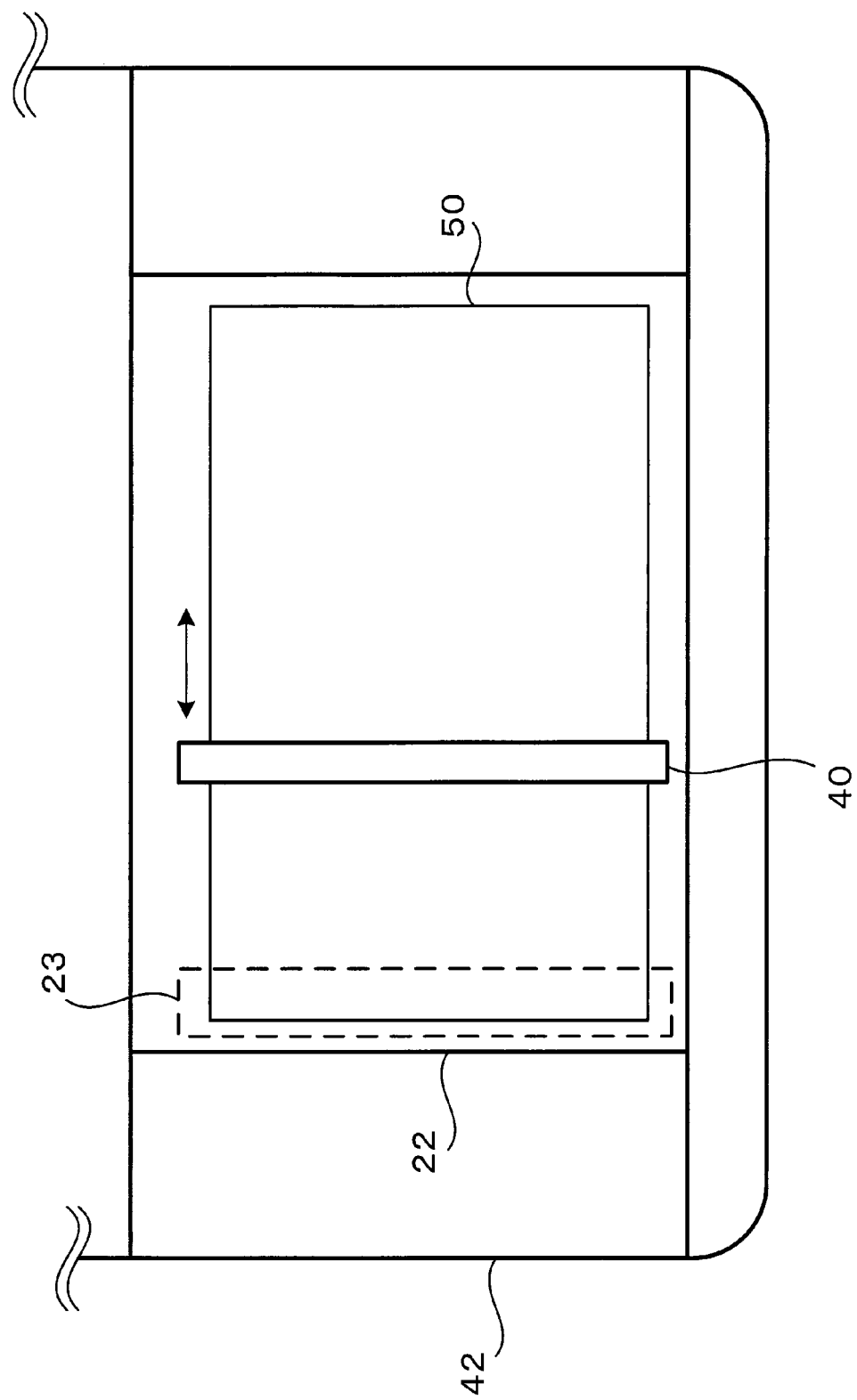
FIG. 6 is a sectional view of a part of a sheet feed tray of an image forming apparatus.

FIG. 6 is a sectional view of a part of a sheet feed tray 22 of the image forming apparatus 42.

FIG. 6 illustrates the state in which a scanner 40 performs scanning in the left-right direction in the corresponding sheet feed tray 22, and in which the image of a sheet 50 held on the sheet feed tray 22 is thus read.

In the present exemplary embodiment, the configuration in which a scanner 40 is used to obtain the image of a sheet 50 in the corresponding sheet feed tray 22 is described. Alternatively, a camera, which is capable of capturing the image of a sheet 50 in a sheet feed tray 22, may be provided, and the camera may be used to obtain the image of the sheet 50.

Figure 7:
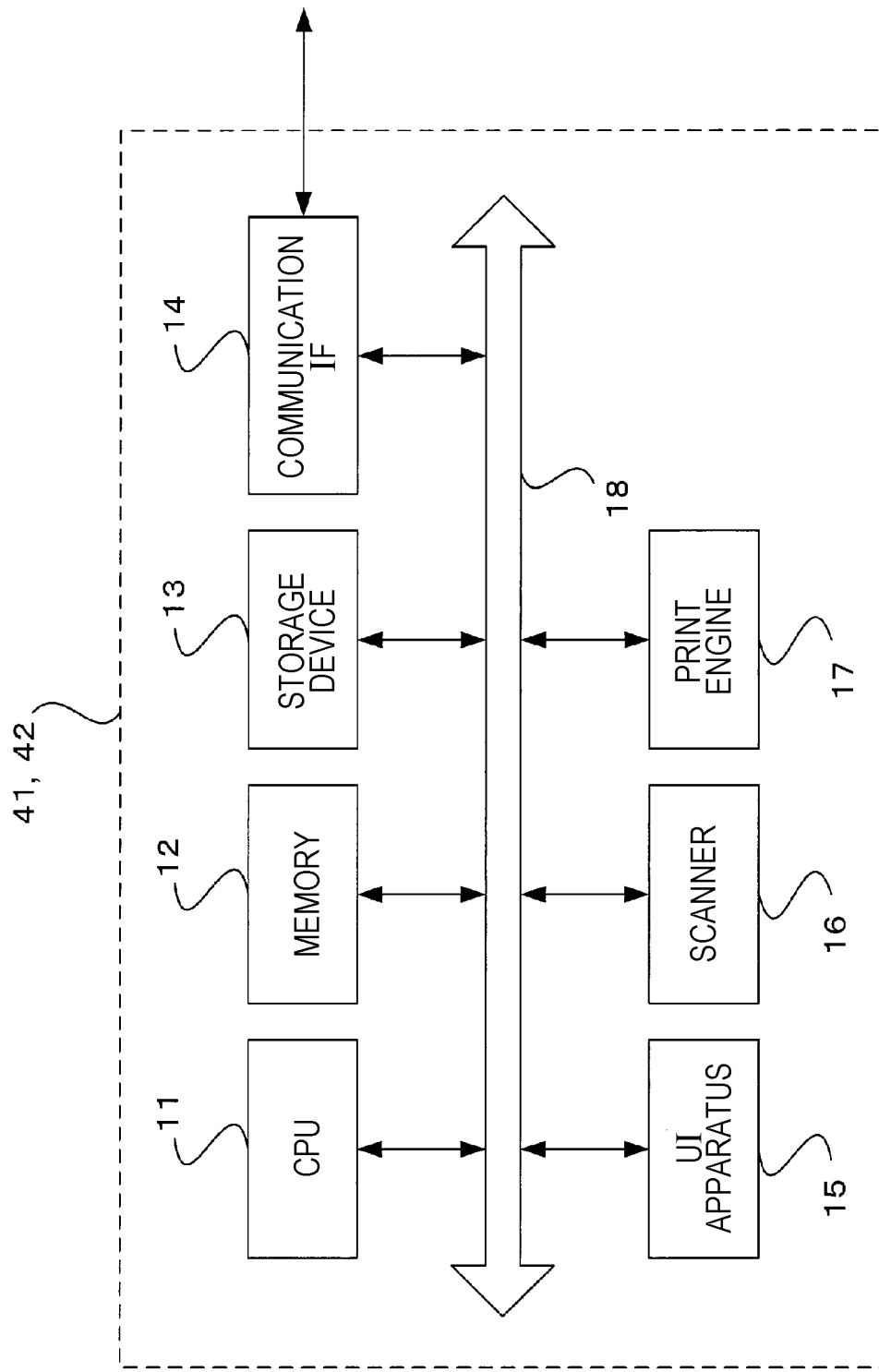
FIG. 7 is a diagram illustrating the hardware configuration of image forming apparatuses in an image forming system according to an exemplary embodiment of the present disclosure.

FIG. 7 illustrates the hardware configuration of the image forming apparatuses 41 and 42 in the image forming system according to the present exemplary embodiment.

As illustrated in FIG. 7, each of the image forming apparatuses 41 and 42 includes a central processing unit (CPU) 11, a memory 12, a storage device 13 such as a hard disk drive, a communication interface (IF) 14 which receives/transmits data from/to external apparatuses and the like over the network 20, a user interface (UI) apparatus 15 including a touch panel or a liquid-crystal display and a keyboard, a scanner 16, and a print engine 17. These components are connected to each other through a control bus 18.

The print engine 17 prints images on recording media such as print sheets through processes, such as charging, exposure to light, developing, transfer, and fixing.

The CPU 11 is a processor which performs given processes on the basis of control programs stored in the memory 12 or the storage device 13 and which controls the operations of the image forming apparatuses 41 and 42. In the present exemplary embodiment, the description will be made under the assumption that the CPU 11 reads, for execution, the control programs stored in the memory 12 or the storage device 13. Alternatively, the programs, which are stored in a storage medium such as a compact disc-read-only memory (CD-ROM), may be provided to the CPU 11.

Figure 8:
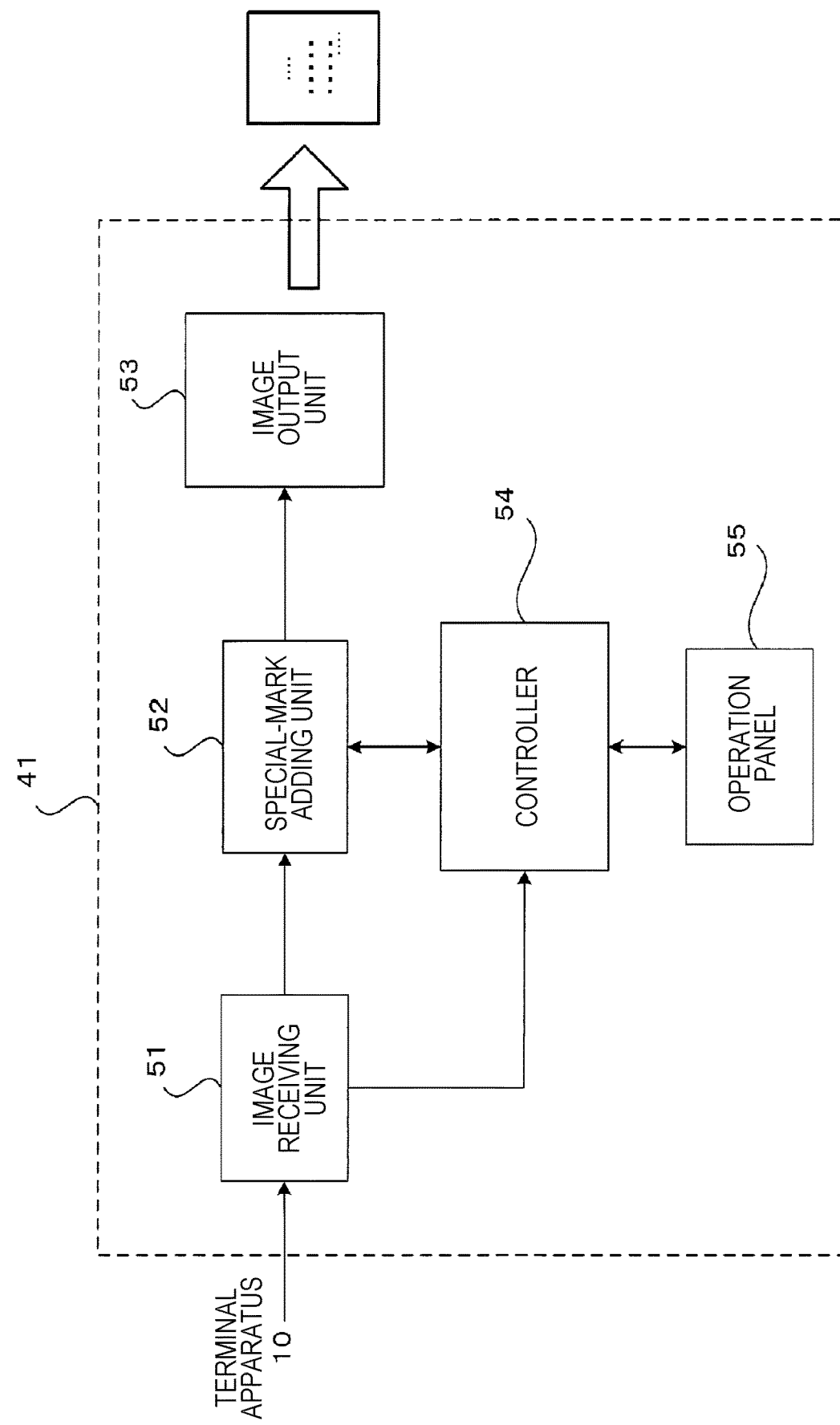
FIG. 8 is a block diagram illustrating the functional configuration of an image forming apparatus.

FIG. 8 is a block diagram illustrating the functional configuration of the image forming apparatus 41 which is implemented through execution of the control programs.

As illustrated in FIG. 8, the image forming apparatus 41 according to the present exemplary embodiment includes an image receiving unit 51, a special-mark adding unit 52, an image output unit 53, a controller 54, and an operation panel 55.

The image receiving unit 51 receives image data, which is output on a sheet, as an input image from the terminal apparatus 10 over the network 20.

The controller 54 analyzes an input image received by the image receiving unit 51, and determines the position at which a preset special mark may be added.

The special-mark adding unit 52 adds a special mark at the position, which is determined by the controller 54, to the input image received by the image receiving unit 51.

The special mark is, for example, a symbol indicating the orientation of an image, such as an arrow. However, the special mark is not necessarily a symbol from which a person recognizes the orientation of the image. A symbol of any shape may be used as long as the orientation of the image may be determined from the special mark. In the case where, as described below, the second-printing image forming apparatus 42 reads the special mark by using a scanner 40 to determine the orientation of the image, the read special mark may be used in the determination. The symbol encompasses not only a figure but also a character and a string. For example, a string, such as "Up in this direction", may be used as the special mark. A combination of a character and a figure, such as "UP ↑", may be used as the special mark.

The image output unit 53 outputs an image, to which the special-mark adding unit 52 has added the special mark, on a recording medium such as a print sheet.

The operation panel 55, which is formed, for example, of a touch panel and which is controlled by the controller 54, receives operations from users and displays information to users.

The functional configuration of the image forming apparatus 42, which performs second-printing, will be described by referring to the block diagram in FIG. 9.

Figure 9:
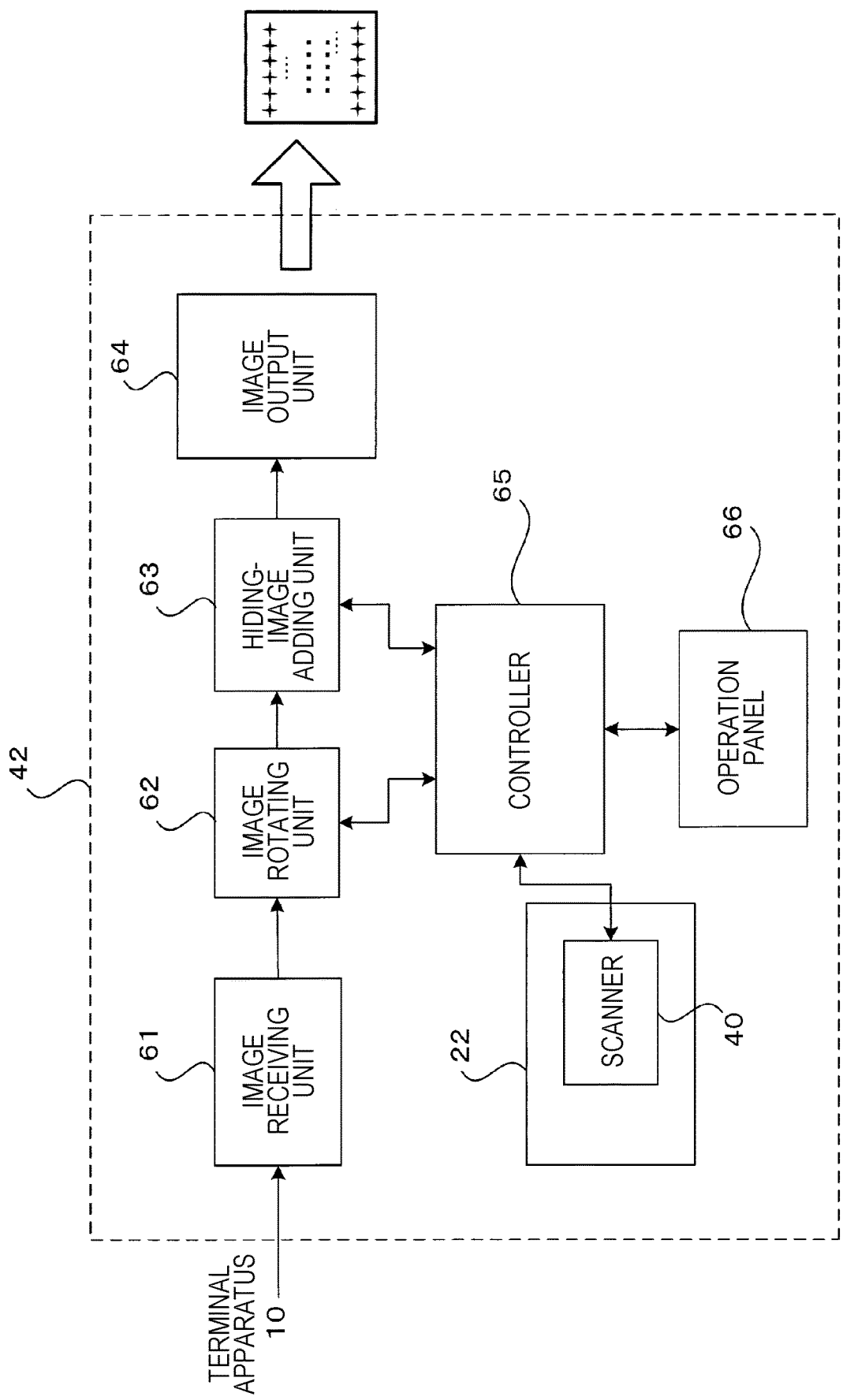
FIG. 9 is a block diagram illustrating the functional configuration of an image forming apparatus.

As illustrated in FIG. 9, the image forming apparatus 42 according to the present exemplary embodiment includes an image receiving unit 61, an image rotating unit 62, a hiding-image adding unit 63, an image output unit 64, a controller 65, and an operation panel 66.

The image receiving unit 61 receives image data, which is output on a sheet, as an input image from the terminal apparatus 10 over the network 20.

The image rotating unit 62 rotates an input image, which is received by the image receiving unit 61, on the basis of an instruction from the controller 65. The hiding-image adding unit 63 adds a hiding image for hiding the special mark, at the position, which is specified by the controller 65, to the input image from the image rotating unit 62.

The color of the hiding image is set to a color in the same color series as the background color of the sheet. That is, if the background color of a sheet is white, white is set. In the present exemplary embodiment, a typical white sheet is used as a sheet on which an image is formed. Thus, a white image using the white toner is used as the hiding image.

The controller 65 controls a scanner 40 so that the image of a sheet, on which the image has been formed by the different image forming apparatus 41, is read in the state in which the sheet is held on the sheet feed tray 22. The controller 65 detects the special mark, which is a symbol indicating the orientation of the image, from the image of the sheet which has been read.

When the controller 65 fails to detect the special mark from the image of the sheet which has been read, the controller 65 notifies a user, who uses the image forming apparatus 42, through the operation panel 66, that the sheet, which is held on the sheet feed tray 22, is to be turned over.

When the orientation of the image which is indicated by the detected special mark is different from the orientation of the image which is to be formed on the sheet, the controller 65 performs a correction process of matching the orientation of the image, which is indicated by the detected special mark, with the orientation of the image which is to be formed on the sheet.

An example of the correction process is a process in which, when the orientation of an image indicated by the detected special mark is different from the orientation of an image which is to be formed on the sheet, a user is notified through the operation panel 66 that the orientation of the sheet held on the sheet feed tray 22 is to be reversed. However, this causes time and effort for the user to reset the sheet, which has been set on the sheet feed tray 22, so that the orientation of the sheet is reversed.

Another example of the correction process is a process in which, when the orientation of the image which is indicated by the detected special mark is different from the orientation of the image which is to be formed on the sheet, the orientation of the image which is to be formed on the sheet is rotated. The case in which the controller 65 performs the correction process of rotating the orientation of the image which is to be formed on the sheet will be described below.

The controller 65 notifies the hiding-image adding unit 63 of the position of the special mark detected from the image of the sheet which has been read by a scanner 40. The hiding-image adding unit 63 adds a white hiding image at the position in the input image which is specified by the controller 65. As a result, the image output unit 64 forms, on the sheet, an image in which a hiding image for hiding the detected special mark is superimposed.

That is, the image output unit 64 forms, on the sheet, an image, in which a white hiding image of a preset size is formed, at the position, on the sheet, of the special mark detected from the image of the sheet which has been read. This causes the state, in which the hiding image is superimposed on the special mark, in the final output image which is output from the image output unit 64, causing the special mark not to be viewed by users.

The operations of the image forming system according to the present exemplary embodiment will be described in detail by referring to drawings.

The case in which the output result illustrated in FIG. 2 is generated through overprinting by the image forming apparatuses 41 and 42 will be described below.

Figure 10:
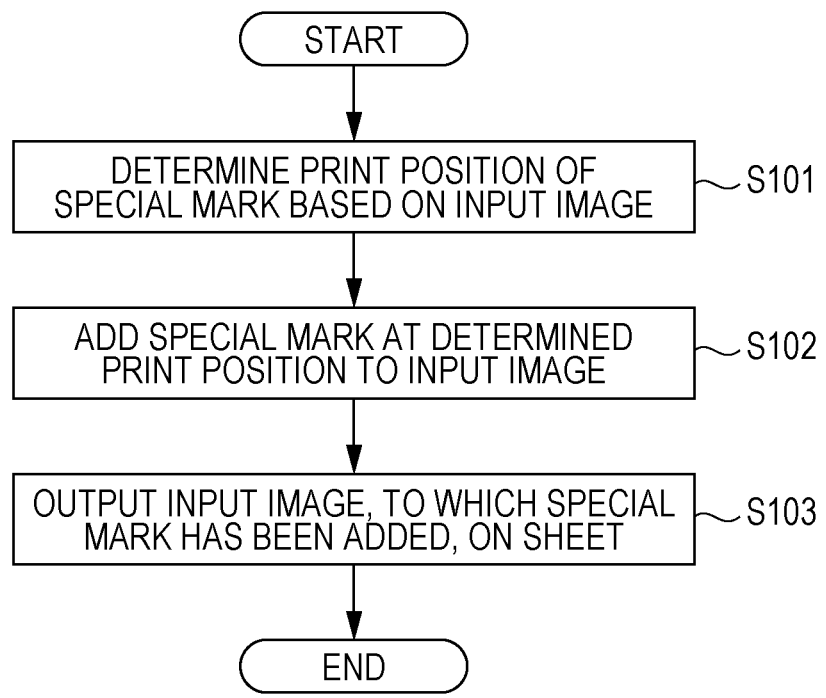
FIG. 10 is a flowchart for describing operations performed by a first-printing image forming apparatus.

The operations performed by the first-printing image forming apparatus 41 will be described by referring to the flowchart in FIG. 10.

In step S101, the controller 54 in the first-printing image forming apparatus 41 analyzes an input image from the terminal apparatus 10, and determines the print position of the special mark.

How to determine the print position of the special mark will be described in detail by referring to FIG. 11.

The special mark is to be printed at a more inconspicuous position. Thus, the special mark is printed at a position closer to the top or bottom end of the sheet if possible. If the special mark is superimposed on an input image, the superimposed part of the input image disappears when the special mark is hidden by a hiding image. Therefore, the position at which an input image is not present needs to be selected as the print position of the special mark.

Figure 11:
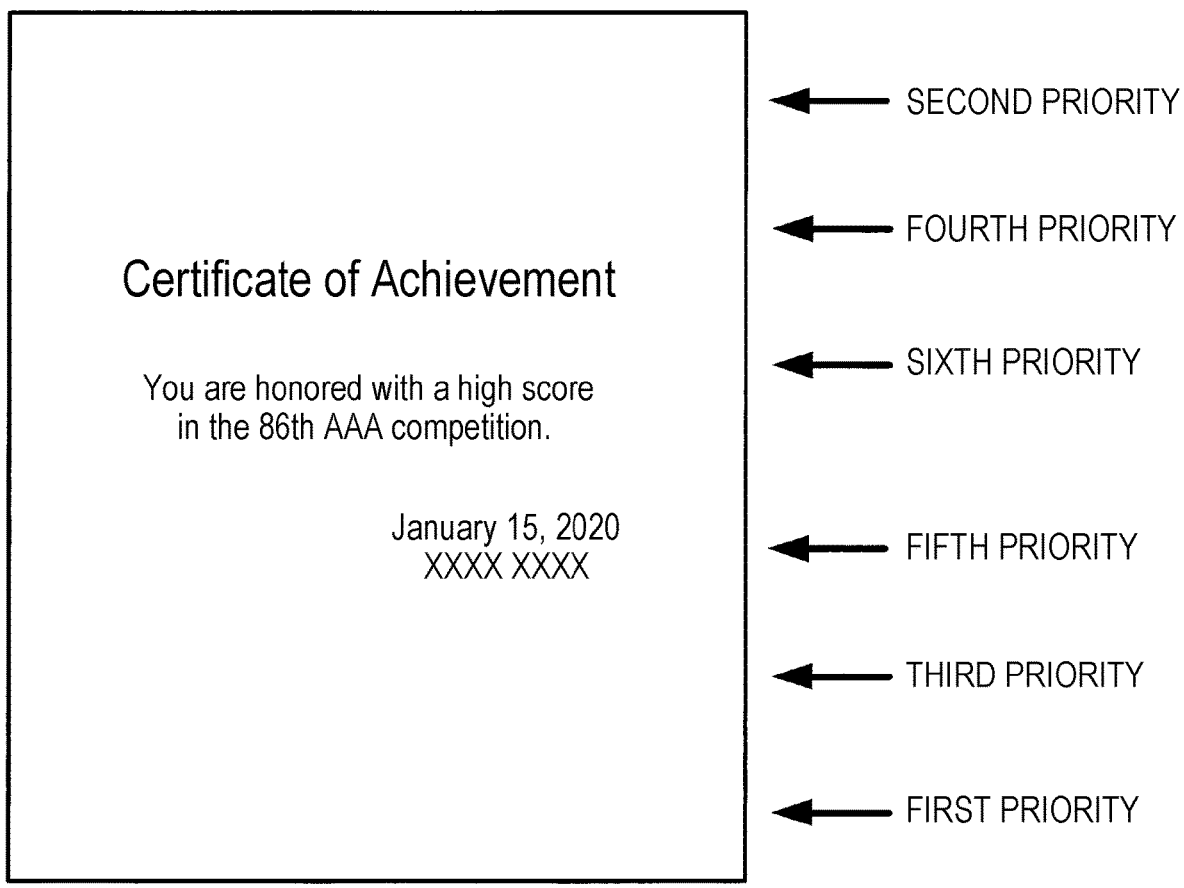
FIG. 11 is a diagram for describing the method of determining the print position of a special mark.

To satisfy such a condition, priorities as illustrated in FIG. 11 are set for the print positions at which the special mark is printed. The controller 54 uses each position in this priority order to determine whether the special mark may be printed at the position, and determines the first satisfying position as the print position of the special mark.

The description will be made below under the assumption that the controller 54 determines the position, which is set as the first priority, as the print position of the special mark.

When the print position of the special mark is thus determined, the controller 54 notifies the special-mark adding unit 52 of the determined print position. As a result, in step S102, the special-mark adding unit 52 adds the special mark at the notified print position to the input image received by the image receiving unit 51.

In step S103, the image output unit 53 outputs, on the sheet, an image on the basis of the input image to which the special mark has been added by the special-mark adding unit 52.

Figure 12:
FIG. 12 is a diagram illustrating an output image example obtained by an image forming apparatus after first-printing.

FIG. 12 illustrates an output image example thus obtained by the image forming apparatus 41. The output image illustrated in FIG. 12 is a resulting output image of the first-printing. In FIG. 12, a special mark 80, which indicates the orientation of the image, is printed for the input image at the bottom right of the sheet.

Figure 13:
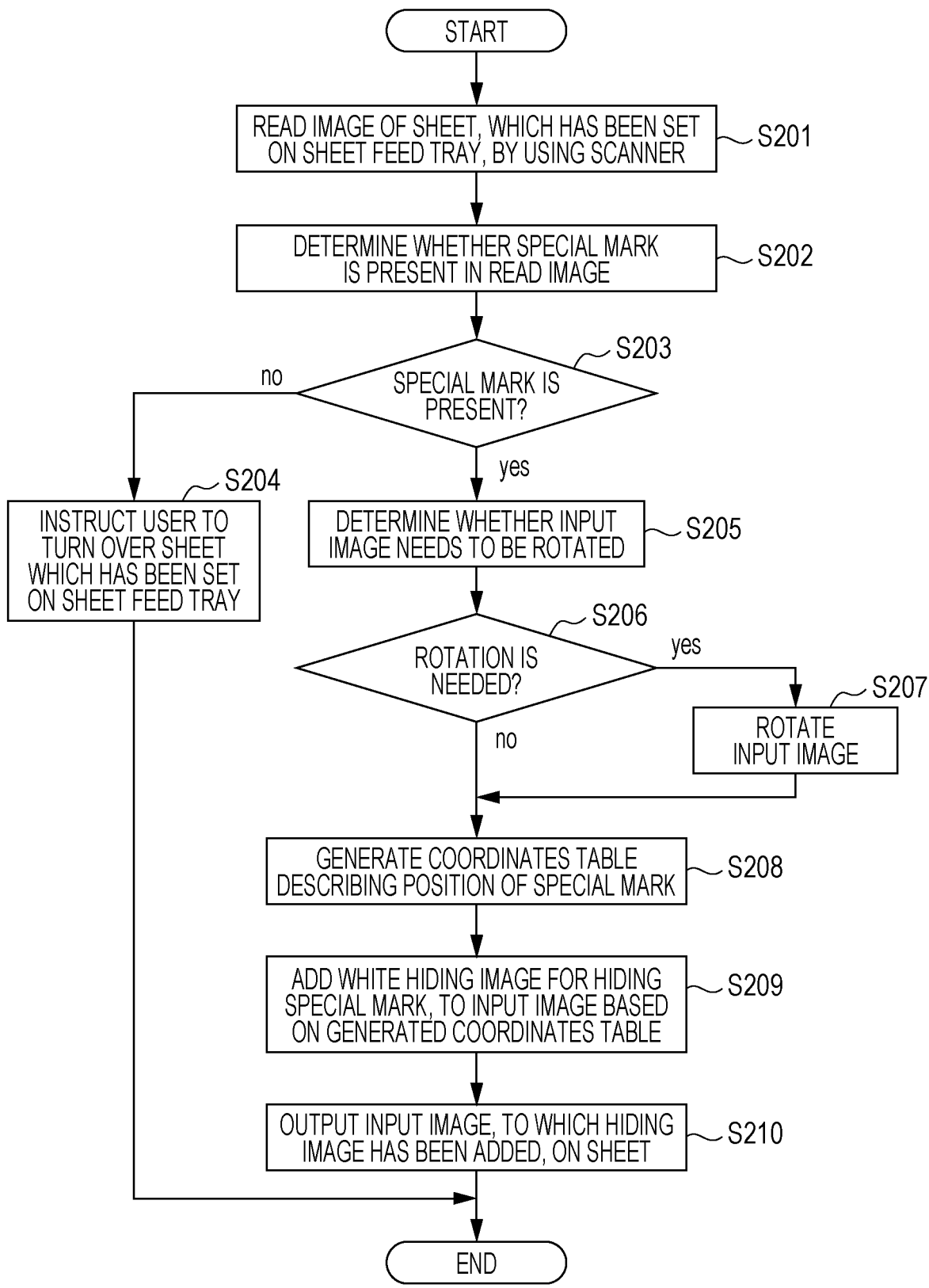
FIG. 13 is a flowchart for describing operations performed by a second-printing image forming apparatus.

The operations performed by the second-printing image forming apparatus 42 will be described by referring to the flowchart in FIG. 13.

A user sets the sheet after the first-printing, which is illustrated in FIG. 12, to a sheet feed tray 22 of the image forming apparatus 42.

In step S201, the controller 65 reads the image of the sheet, which has been set on the sheet feed tray 22, by using the scanner 40.

In step S202, the controller 65 determines whether the special mark is present in the image which has been read by the scanner 40. On the basis of the determination result in step S202, the controller 65 switches the process as in step S203.

That is, in step S203, if the controller 65 determines that no special marks are present in the image which has been read by the scanner 40, in step S204, the controller 65 instructs the user through the operation panel 66 to turn over the sheet which has been set on the sheet feed tray 22.

FIG. 14 illustrates an exemplary state in which a user is instructed through the operation panel 66. Referring to FIG. 14, the characters, "Set again the sheet, which has been put on the sheet feed tray for overprinting, so that the sheet is turned over." are displayed on the operation panel 66 of the image forming apparatus 42.

If the sheet feed tray 22 is provided with a mechanism of turning over a sheet which has been set, without such an instruction to the user, the sheet on the sheet feed tray 22 may be turned over automatically.

In step S203, if the controller 65 determines that the special mark is present in the image which has been read by the scanner 40, in step S205, the controller 65 determines whether the input image needs to be rotated.

How to determine whether an input image needs to be rotated will be described in detail by referring to FIGS. 15A and 15B.

The controller 65 determines whether an input image needs to be rotated, on the basis of the direction of the special mark 80 in the image obtained from the scanner 40. For example, the image example in FIG. 15A indicates the case in which the orientation of the input image which is to be printed matches the orientation of the image obtained by the scanner 40. In this case, the controller 65 determines that the input image does not need to be rotated.

Figure 15B:
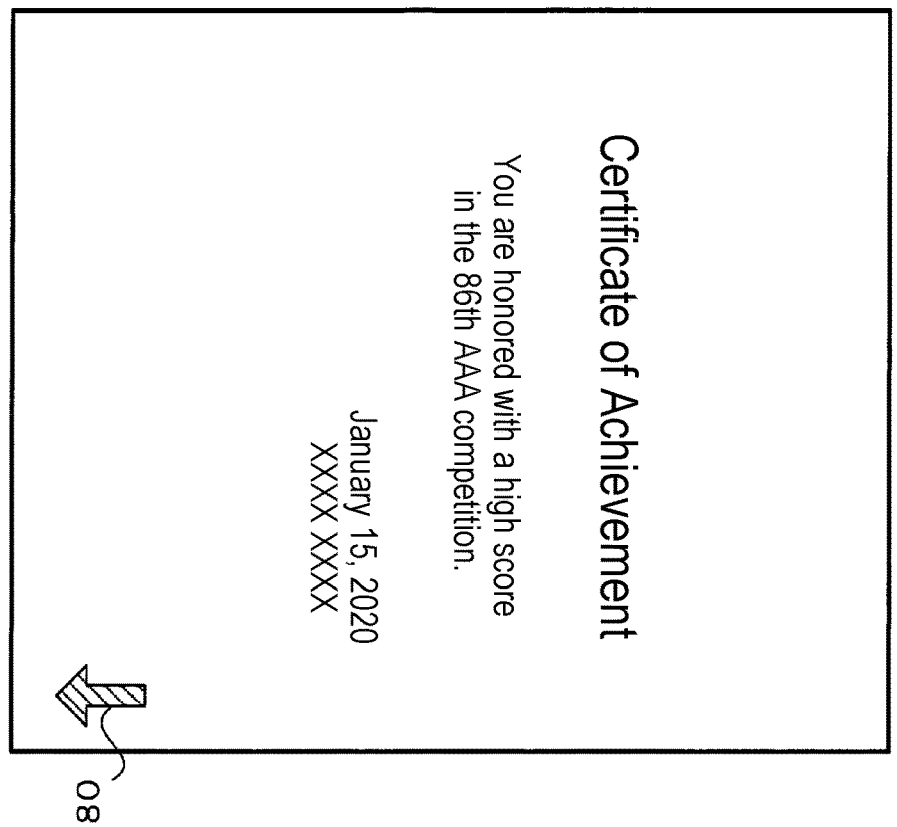
FIGS. 15A and 15B are diagrams for describing the method of determining whether an input image needs to be rotated.
Figure 15A:
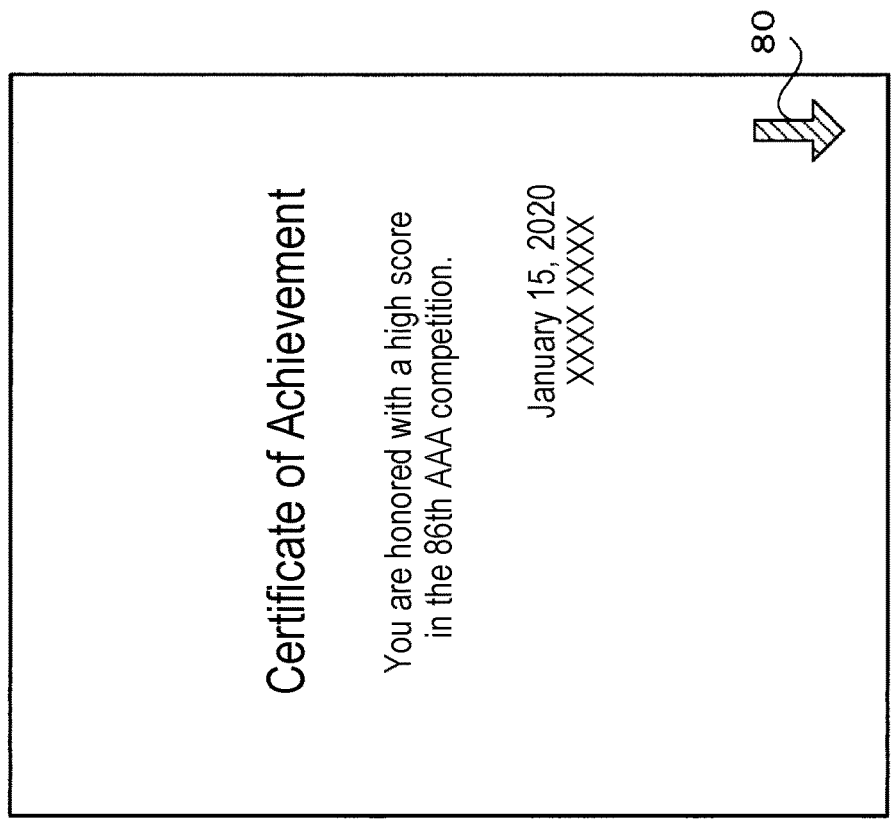

The image example in FIG. 15B indicates the case in which the orientation of the input image which is to be printed is opposite, by 180°, to the orientation of the image obtained by the scanner 40. In this case, the controller 65 determines that the input image needs to be rotated.

In step S206, if the determination result as to whether the input image needs to be rotated indicates that the rotation needs to be performed, the controller 65 instructs the image rotating unit 62 to rotate the input image. Thus, in step S207, the image rotating unit 62 rotates the input image.

If the image rotating unit 62 does not receive, from the controller 65, an instruction to rotate the input image, the image rotating unit 62 transfers the input image, which has been received by the image receiving unit 61, to the hiding-image adding unit 63 without rotation of the input image.

In step S208, the controller 65 generates a coordinates table on the basis of the coordinates of the position of the special mark in the image which has been read by the scanner 40.

FIG. 16 illustrates an exemplary coordinates table about the positions of special marks which is thus generated. Referring to FIG. 16, the X coordinate and the Y coordinate of the position of the special mark for each page are stored. The value of a coordinate indicates the distance from the reference position to the center position of the special mark, for example, in the case where a certain position of the sheet is set to the reference position.

In step S209, the hiding-image adding unit 63 adds a white hiding image for hiding the special mark, to the input image, which has been transferred from the image rotating unit 62, on the basis of the coordinates table which describes the position of the special mark and which is generated by the controller 65.

In step S210, the image output unit 64 performs second-printing of outputting an image based on the input image to which the hiding image has been added, on the sheet after the first-printing which is fed from the sheet feed tray 22.

Figure 17:
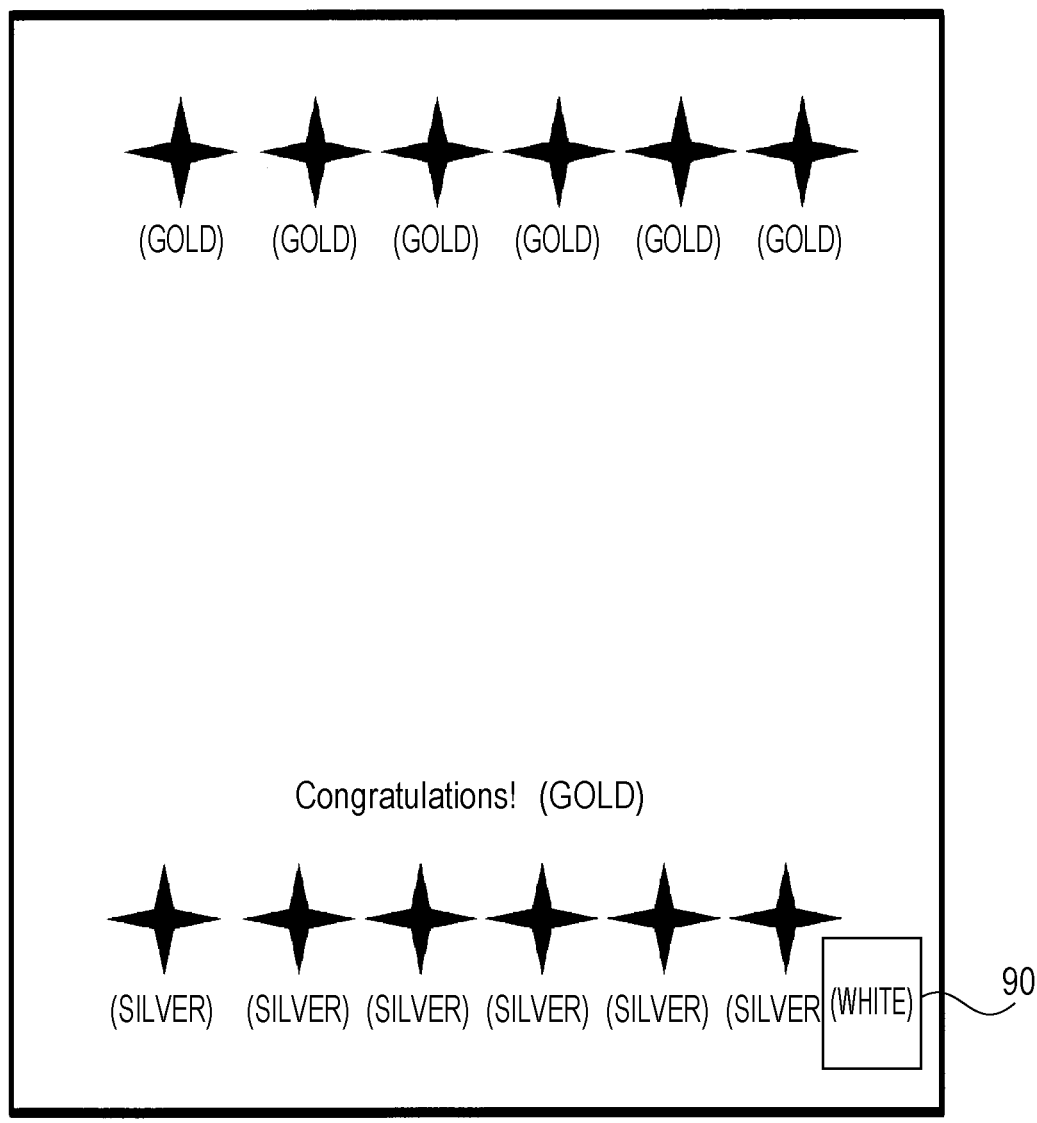
FIG. 17 is a diagram illustrating an output image example which is output on a sheet by an image forming apparatus.

FIG. 17 illustrates an output image example which is output on the sheet by the image forming apparatus 42.

The output image illustrated in FIG. 17 includes gold images using the gold toner and silver images using the silver toner, as well as a white hiding image 90. The print position of the hiding image 90 is that of the special mark which is output in the first-printing.

Figure 18:
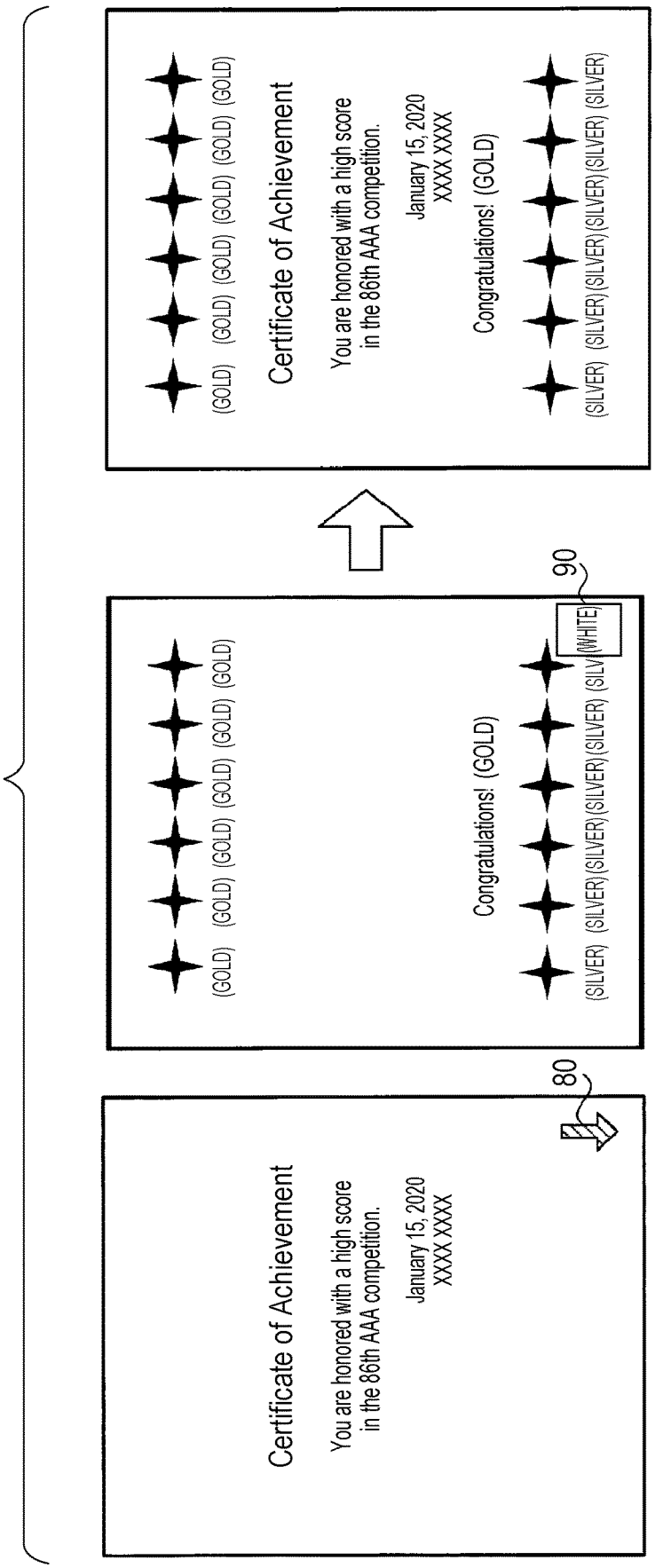
FIG. 18 is a diagram illustrating a final output image obtained by an image forming apparatus performing second-printing on a sheet on which an image forming apparatus has performed first-printing.

Thus, as illustrated in FIG. 18, the image forming apparatus 42 performs second-printing on the sheet after first-printing performed by the image forming apparatus 41. In the final output image, the white hiding image 90 is output on the special mark 80.

As a result, in the final output image, users are not able to recognize the special mark 80 visually.

In the present exemplary embodiment described above, the case of overprinting, in which the second-printing image forming apparatus 42 further forms an image on a sheet on which the first-printing image forming apparatus 41 has formed an image, is described. However, the present disclosure is not limited to the case in which a first-printing image forming apparatus is different from a second-printing image forming apparatus. The present disclosure may be applied similarly to the case of overprinting in which an image forming apparatus forms an image on a sheet on which the image forming apparatus further forms another image. That is, even when first-printing is performed by an image forming apparatus different from a second-printing image forming apparatus, or even when the second-printing image forming apparatus also performs first-printing, the second-printing image forming apparatus may perform second-printing through execution of the process described above.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
a memory; and
a processor configured to
read a first image of a sheet held on a sheet holding unit, the sheet being a sheet on which an image has been formed,
detect a symbol from the first image of the sheet which has been read, the symbol indicating an orientation of the first image,
when the orientation of the first image indicated by the detected symbol is different from an orientation of a second image that is to be formed on the sheet, perform a correction process comprising matching the orientation of the first image with the orientation of the second image that is to be formed on the sheet, the orientation of the first image being indicated by the detected symbol, and
when the symbol indicating the orientation of the first image fails to be detected from the first image of the sheet which has been read, notify a user that the sheet is to be turned over.

2. The image forming apparatus according to claim 1, wherein the processor is configured to form a third image on the sheet, the third image being superimposed on the detected symbol to hide the detected symbol.

3. The image forming apparatus according to claim 2, wherein the processor is configured to form the third image on the sheet at a position, on the sheet, of the symbol detected from the first image of the sheet which has been read, the third image being of a preset size.

4. The image forming apparatus according to claim 2, wherein a color of the third image is in color series identical to a background color of the sheet.

5. The image forming apparatus according to claim 1, wherein the correction process comprises, when the orientation of the first image indicated by the detected symbol is different from the orientation of the second image that is to be formed on the sheet, notifying a user that the orientation of the sheet is to be reversed.

6. The image forming apparatus according to claim 1, wherein the correction process comprises, when the orientation of the first image indicated by the detected symbol is different from the orientation of the second image that is to be formed on the sheet, rotating the orientation of the second image that is to be formed on the sheet.

7. A non-transitory computer readable medium storing a program causing a computer to execute a process comprising:

reading a first image of a sheet held on a sheet holding unit, the sheet being a sheet on which an image has been formed;

detecting a symbol from the first image of the sheet which has been read, the symbol indicating an orientation of the first image;

when the orientation of the first image indicated by the detected symbol is different from an orientation of a second image that is to be formed on the sheet, performing a correction process comprising matching the orientation of the first image with the orientation of the second image that is to be formed on the sheet, the orientation of the first image being indicated by the detected symbol; and when the symbol indicating the orientation of the first image fails to be detected from the first image of the sheet which has been read, notifying a user that the sheet is to be turned over.

8. An image forming apparatus comprising:

means for storing data;

means for reading a first image of a sheet held on a sheet holding unit, the sheet being a sheet on which an image has been formed;

means for detecting a symbol from the first image of the sheet which has been read, the symbol indicating an orientation of the first image; and, means for, when the orientation of the first image indicated by the detected symbol is different from an orientation of a second image that is to be formed on the sheet, performing a correction process comprising matching the orientation of the first image with the orientation of the second image that is to be formed on the sheet, the orientation of the first image being indicated by the detected symbol; and means for, when the symbol indicating the orientation of the first image fails to be detected from the first image of the sheet which has been read, notifying a user that the sheet is to be turned over.

* * * * *